United States Patent Office 2,884,347
Patented Apr. 28, 1959

2,884,347

STARCH AND PROCESS THEREFOR

Kenneth C. Hobbs, Clarendon Hills, Ill., assignor to Corn Products Company, a corporation of New Jersey No Drawing. Application March 9, 1956
Serial No. 570,415

3 Claims. (Cl. 127—71)

This invention relates to a process and modifications thereof for improving the color and clarity of pastes made from various starches and in particular from "thin boiling" starch in granule form and "thin boiling" hydroxyalkyl starch in granule form.

An object of this invention is to provide a method for removal of color from ungelatinized starch and starch derivatives. A further object is to provide a method for improving clarity of pastes made from "thin boiling" starch and starch derivatives. Another object is to improve the color of "thin boiling," hydroxyalkyl starch in dry, granule form. Still a further object is to provide a rapid and convenient method for adjusting the final acidity of "thin boiling" starch products. Other objects will appear hereinafter.

The descriptive term "thin boiling" is commonly employed in the starch industry to identify starch products which have been degraded to various stages, usually by acid modification or by hypochlorite oxidation. The extent of degradation may be very slight or it may be sufficient to result in very large reductions in paste viscosity but it may not exceed the stage at which the product is no longer filterable from aqueous slurries.

It is known in the prior art that the clarity of a starch paste can be improved significantly if the pH of the paste is raised to about 10 or higher. However, this high pH level not only has an adverse effect on paste color, particularly in the case of acid modified starch products, but the high pH of such pastes also places a drastic limitation on their usefulness.

The color of starch products may be improved by treatment with potassium permanganate or by hypochlorite oxidation. However, while potassium permanganate improves the whiteness of ungelatinized starch, it does not improve paste clarity. Hypochlorite oxidation improves the color of starch products and also improves paste clarity substantially in some instances when the oxidation is relatively extensive, but by prior art methods these improvements are accompanied by large changes in paste viscosity.

In contrast to prior art methods, the present invention provides novel and inexpensive methods of improving both color and paste clarity of certain starch products without causing any significant change in their paste viscosities.

I have discovered that the properties of various starch products, particularly "thin boiling" starch or "thin boiling" hydroxyalkyl starch, both in granule form, may be improved in the respects noted by a process wherein the starch is filtered and washed at pH below about 4.0, preferably in the pH range of 2.0 to 3.0. The starch is then reslurried, adjusted to a higher pH level, preferably in the pH range of about 6.0 to 8.0, and is filtered, washed and dried.

I have discovered also that even greater improvements in paste color and clarity are realized if a low pH filtration is followed by a wash with a dilute aqueous solution of a water soluble salt, such as sodium, potassium and ammonium salts. I have discovered additionally that by employing dilute solutions of salts of weak acids for washing starch after a low pH filtration, the pH level of the starch product may be adjusted on the filter to any pH level in the desired range of about 6.0 to 8.0 or higher by selection of the proper salt or combinations of salts contained in the wash water. This method of pH adjustment eliminates the necessity of reslurrying the starch, adjusting the pH level of the aqueous slurry and a second relatively costly filtration step. Furthermore, it has been found that due to the excellent buffering capacity of salts of weak acids reproducibility of finished product pH level is unexcelled. Although satisfactory results are obtained with many different salts and combinations of salts when employed in the manner described above, a mixture of primary and secondary sodium phosphate which produces wash water having a pH level of about 6.5 is preferred. While the amount of salt employed is not critical, optimum results are realized when 1 part of starch is washed with 1 to 2 parts of wash water containing 1 to 2 percent salt. It is usually necessary when using these preferred amounts of salt solution to give the starch product a final wash with water to remove the salt solution and starch impurities which may be contained therein.

I have discovered also that "thin boiling" products which produce exceptionally clear and practically colorless pastes can be prepared by a process wherein a hydroxyalkylated starch is acid modified in granule form, filtered and washed at a pH level of about 3.5 or below, reslurried, treated at pH 9.0 to about 11.5 with a dilute sodium hypochlorite solution containing from about 0.1 to about 1.0 percent "available chlorine" based on starch weight, adjusted to a slurry pH level in the range of about 6.0 to 9.5, filtered, washed with water and dried.

In this process the low pH filtration was found to be a major factor contributing to the excellent paste clarity and low color of the finished products. Although it is preferred to insert the low pH filtration step at the stage indicated above, benefits are also realized by a low pH filtration prior to acid modification or after the hypochlorite treatment.

In addition to improving the properties of acid modified products, a low pH filtration also results in improved paste clarities and a reduction in color of starch products which have been rendered "thin boiling" solely by hypochlorite oxidation.

Although the most striking improvements in paste clarity and color are observed when the low pH filtration step is employed with "thin boiling" starch derivatives and waxy starches which have a reduced tendency toward molecular aggregation in a pasted state, a low pH filtration also improves the color and brightness of unmodified starch and acid-modified but underivatized starches, although the degree of improvement in paste clarity is greater with "thin boiling" starch and starch derivatives than those not rendered "thin boiling."

While the exact role played by a low pH filtration in this invention is not understood fully, it is believed that the acid liberates traces of compounds of polyvalent metallic elements, such as those of calcium, magnesium and iron, which tend to form complexes with carbohydrate materials. It is believed that these impurities are removed by filtering and washing the product at low pH levels and that the presence of sodium, potassium and ammonium salts in the wash water assists in the displacement of undesirable impurities.

The term "starch products," as used hereinafter, is intended to include starch and starch derivatives in unmodified form as well as acid modification, oxidation and any other modification which does not destroy the granule structure of the product.

The following examples set forth below, which are intended as typical and informative only and not in a limiting sense, will further illustrate the invention.

EXAMPLE 1

To a slurry containing 1620 g. of grain sorghum starch in 2180 ml. of water at 40° C. was added a slurry containing 33.0 g. of hydrated lime in 200 ml. of water. After reducing the internal pressure in the reaction flask to the vapor pressure of water at 40° C., 95.6 g. of ethylene oxide was added. Hydroxyethylation of starch was allowed to proceed for 425 minutes. At this stage 64.2 percent of the added oxide had been consumed and the starch contained 0.105 hydroxyethyl groups per anhydroglucose unit. Hydroxyethylation was stopped and acid modification was started by addition of 600 ml. of 3.84 N hydrochloric acid. After 16 hours of stirring at 40° C., the reaction mixture was divided into twenty-two 200 ml. portions, each containing 76 g. of "thin boiling" product. Using an aqueous slurry of hydrated lime for neutralization, a series of seven samples representing pH levels of 7.0, 6.0, 5.0, 4.0, 3.0, 2.0 and 1.0, was prepared. Each sample was filtered, washed with 100 ml. of water, reslurried, adjusted to pH 7.5 with 1.0 N sodium hydroxide solution, filtered and washed with 100 ml. of water. Finally each sample was slurried in water to a total weight of 380 g. and pastes (concentration=20 percent) were prepared by the procedure commonly employed in the determination of Scott viscosities. After cooling and standing at room temperature for 20 hours, the clarity of each paste was determined with a Coleman Nepho-Colorimeter. Data presented in Table I show that filtration at pH levels below about 3.0 results in substantial improvements in paste clarity.

*Table I*

| pH Level of First Filtration | Paste, pH | Paste Clarity (Percent Light Transmittancy) |
|---|---|---|
| 7.0 | 7.3 | 11 |
| 6.0 | 7.0 | 14 |
| 5.0 | 7.4 | 25 |
| 4.0 | 7.3 | 26 |
| 3.0 | 7.3 | 42 |
| 2.0 | 7.3 | 47 |
| 1.0 | 7.2 | 55 |

EXAMPLE 2

Four additional samples of the "thin boiling" product in acidic slurry prepared as described under Example 1 were treated as follows: One sample was adjusted to pH 7.0 witht 1.0 N sodium hydroxide, filtered, washed with 100 ml. of water, reslurried, filtered and washed with 100 ml. of water. Three other samples were adjusted to pH levels of 2.0, 3.0 and 4.0 with a slurry of hydrated lime, filtered and washed in sequence with 100 ml. of water, 100 ml. of 1.7 percent sodium phosphate solution at pH 6.5 and finally with 100 ml. of water. A paste of each of these products was prepared and tested in the monner described under Example 1. Data in Table II show that when hydroxyethyl starch is filtered at a low pH level and then is washed with a dilute solution of sodium phosphate at pH 6.5, paste clarities are superior to those of products prepared by the procedure described under Example 1.

*Table II*

| pH Level of Filtration | Sodium Phosphate In Wash Water | Paste, pH | Paste Clarity (Percent Light Transmittancy) |
|---|---|---|---|
| 7.0 | No | 6.8 | 22 |
| 2.0 | Yes | 7.4 | 67 |
| 3.0 | Yes | 7.4 | 65 |
| 4.0 | Yes | 7.2 | 49 |

In addition to providing an improvement in paste clarity over that realized by a low pH filtration performed in the manner described under Example 1, use of a dilute solution of a water soluble salt of a weak acid as wash water eliminates three processing steps: (1) reslurrying the starch, (2) a pH adjustment, and (3) a second filtration.

EXAMPLE 3

Three additional samples of acidic reaction mixture from the preparation described under Example 1 were adjusted to pH 2.0 with a slurry of hydrated lime and the products were filtered and washed with 100 ml. of water. Each product was reslurried in water and adjusted to pH 10.5 by addition of 6.0 ml. of 1.0 N sodium hydroxide solution. One sample was stirred at this pH level for 2.0 hours at 40° C., adjusted to pH 7.5 and the product was filtered, washed with 100 ml. of water and dried. The second and third samples were treated in exactly the same manner except that 50 ml. of solution containing 0.001 and 0.0025 mole, respectively, of sodium hypochlorite was added at the start of the 2-hour holding period. The amounts of hypochlorite employed here are equivalent to 0.093 and 0.23 percent, respectively, of "available" chlorine based on starch weight. This is far below the amounts (1 to about 4 percent) normally employed in the commercial production of hypochlorite oxidized starches. Furthermore, as will be demonstrated under Example 5, the hypochlorite treatment described here is ineffective if the low pH filtration is omitted. Data presented in Table III show that the combination of a low pH filtration and a mild hypochorite treatment greatly improves paste clarity.

*Table III*

| Hypochlorite Added (Percent "Available" Chlorine) | 75 g. Scott Viscosity (Seconds) | Paste, pH | Paste Clarity (Percent Light Transmittancy) |
|---|---|---|---|
| 0 | 63 | 8.0 | 54 |
| 0.093 | 86 | 7.7 | 84 |
| 0.23 | 103 | 8.1 | 86 |

In addition to improving paste clarity, all three of the procedures employed in Examples 1, 2 and 3 resulted in an improvement in paste color. Neither the low pH filtration nor the phosphate wash effects paste viscosity significantly. This mild sodium hypochlorite treatment, however, causes a relatively small increase in paste viscosity.

EXAMPLE 4

A slurry containing 1620 g. of 0.05 D.S. hydroxyethyl starch in 2400 ml. of water was acidified by addition of 84 ml. of 3.93 N hydrochloric acid. After stirring for 16 hours at 40° C., the slurry was adjusted to pH 4.0 by addition of hydrated lime. For control purposes a sample of slurry containing 162 g. of starch was adjusted to pH 6.5 with hydrated lime and the product was filtered, washed with 250 ml. of water, reslurried, filtered, washed with 250 ml. of water and dried. Other equal sized samples of the same slurry were filtered at pH 4.0 and washed in sequence with 200 ml. of water, 250 ml. of a 1.0 percent salt solution of the types shown in Table IV and finally with 200 ml. of water. After drying, a paste was prepared from each product by the standard procedure commonly employed in the starch industry in the determination of 40 g. Scott viscosities. In the preparation of these pastes small amounts of N/10 sodium hydroxide was added to the slurries of products which had been washed with solutions containing primary sodium and ammonium phosphates, sodium chloride and sodium sulfate so that paste clarities could be determined at comparable pH levels. Data in Table IV show that filtration at pH 4.0 followed by a wash with a dilute solution of a water soluble salt results in products having unusually high paste clarities.

Table IV

| Type of Salt in Wash Water | Paste, pH | Paste Clarity (Percent Light Transmittancy) |
|---|---|---|
| None (control) | 7.5 | 21 |
| $Na_2HPO_4$ | 9.1 | 70 |
| $NaH_2PO_4$ | 7.0 | 62 |
| $(NH_4)_2HPO_4$ | 7.3 | 64 |
| $(NH_4)H_2PO_4$ | 6.9 | 62 |
| NaCl | 6.9 | 58 |
| $Na_2SO_4$ | 7.1 | 63 |
| $(NH_4)_2CO_3$ | 7.4 | 68 |

When a small amount of ammonium carbonate or secondary ammonium phosphate is dissolved in the water used for washing starch after a low pH filtration, the pH level of the finished product falls in the desired range of 7.0 to 7.5 without the necessity of additional processing steps. This same advantage can be realized by using mixtures of sodium phosphates or other combinations of the salts shown in Table IV which have the proper pH level and buffering capacity.

EXAMPLE 5

A supply of grain sorghum starch was hydroxyethylated and then acid modified by the procedure described under Example 1. After the acid modification step, samples of slurry, each containing about 150 g. of product, were treated as follows:

Sample 1 was adjusted to pH 6.0 with hydrated lime and the product was filtered, washed with 250 ml. of water and dried.

Sample 2 was adjusted to pH 3.0 with hydrated lime, filtered and washed with 250 ml. of water. The product was reslurried in 250 ml. of water and 97 ml. of 0.35 N sodium hypochlorite solution at pH 10.5 was added rapidly. This is equivalent to 0.8 percent "available chlorine" based on starch weight. After stirring for 2 hours at 40° C., the slurry was adjusted to pH 6.0 and the product was filtered, washed and dried.

Sample 3 was adjusted to pH 6.0 with hydrated lime and then treated with sodium hypochlorite and isolated in the manner employed with Sample 2.

Data in Table V show that even with the relatively large amounts of hypochlorite employed in the preparation of Samples 2 and 3, the paste clarity of Sample 3 was no better than that of Control Sample 1 whereas the paste clarity of the product (Sample 2) which received a low pH purification was excellent.

Table V

| Sample | Hypochlorite Added (Percent Available Chlorine) | pH Level of Filtrations | Scott Viscosity (seconds) (50 g.–100 ml.) | Paste, pH | Paste Clarity (Percent Light Transmittancy) |
|---|---|---|---|---|---|
| 1 | 0 | 6.0 | 36 | 6.9 | 21 |
| 2 | 0.8 | 6.0+3.0 | 38 | 6.7 | 90 |
| 3 | 0.8 | 6.0 | 37 | 7.1 | 21 |

EXAMPLE 6

Corn starch was hydroxyethylated and then acid modified in a manner similar to that described under Example 1. After the acid modification stage, a portion of the slurry was adjusted to pH 5.5 with hydrated lime and the product was filtered, washed and dried. Another portion of slurry containing 650 g. of starch, was adjusted to pH 3.5 by addition of hydrated lime. The product was filtered and washed in sequence with 650 ml. of water, 650 ml. of a dilute sodium phosphate solution (concentration approximately 2.0 percent) at pH 6.5 and finally with 650 ml. of water. At comparable paste pH levels, the paste clarity of the product that was filtered at pH 3.5 and then washed with a dilute solution of sodium phosphate was definitely better than that of the product which was filtered and washed in the customary manner. Furthermore, the paste of the phosphate washed product appeared to have better stability on standing and was nearly odorless whereas the paste of the first product had a definite rancid odor by comparison.

EXAMPLE 7

To 12 liters of water at 46° C. contained in a 22 liter flask was added with agitation 11 kg. of unmodified grain sorghum starch. Then 201 g. of ethylene oxide and a slurry of 240 g. of hydrated lime in 1500 ml. of water were added. After 8 hours of reaction at 46° C. with the flask closed, the mixture was adjusted to pH 4.5 by addition of 500 ml. of concentrated hydrochloric acid. The slurry then was acidified to pH 1.28 by addition of another 50 ml. of concentrated hydrochloric acid. After 630 minutes of acid modification at 46° C., a sample of slurry containing 2.6 kg. of dry substance product was adjusted to pH 5.9 by addition of hydrated lime and then the product was filtered, washed with 4 liters of water and dried. A second sample of the ethylene oxide and acid treated starch slurry, containing 1.76 kg. of dry substance product, was adjusted to pH 4.0 by addition of hydrated lime and then the product was filtered and washed in sequence with 3 liters of water, 1 liter of solution (pH=6.5) containing 10 g. of primary sodium phosphate and 7 g. of secondary sodium phosphate, and finally with 2 liters of water.

Analytical data on these two products are presented below:

| | Water-Washed Product | Sodium Phosphate-Washed Product |
|---|---|---|
| Scott Viscosity, 28 g. basis (sec.) | 49 | 48. |
| Paste, pH | 6.7 | 7.3. |
| Sulfated Ash, Percent | 0.151 | 0.156. |
| Iron, Percent | 0.0018 | 0.0012. |
| Paste Clarity: | | |
| 1% conc. (Percent LT) | 79.0 | 80.5. |
| 9% conc. (Percent LT) | 8.0 | 70.0. |
| Paste Color | Slightly Yellow. | Colorless. |

At 9 percent concentration, the paste of the product which was washed with sodium phosphate solution was exceptionally clear in comparison to that of the product receiving only a water wash. In addition, the phosphate washed sample had a bright white appearance in the granular state whereas, in comparison, the product which received only the customary water wash had a dull greyish-white appearance.

EXAMPLE 8

A batch of hydroxyethyl starch was prepared from grain sorghum starch and then acid modified in the manner described in Example 5. After 205, 445, 470, 540 and 602 minutes of acid modification small samples of slurry, each containing 25 g. of dry substance, were filtered and the products washed in sequence with 50 ml. of water, 50 ml. of a 1.0 percent sodium phosphate (i.e., a mixture of 10 parts of primary sodium phosphate and 7 parts of secondary sodium phosphate) solution having a pH level of 6.5 and finally with 50 ml. of water. Each sample was reslurried in sufficient water to give a total slurry weight of 308 g. and pastes were prepared by heating each mixture in a boiling water bath for 15 minutes. All of the resultant pastes were almost completely transparent and colorless, even after cooling and standing for several days.

In this example, it will be observed that the customary neutralization step after acid modification was eliminated completely with a savings in both time and alkali. The pH levels of the pastes, however, were uniformly 7.5.

EXAMPLE 9

A slurry containing 180 g. of waxy maize starch in 270 ml. of water was acidified by addition of 15 ml. of 1.87 N hydrochloric acid. After stirring for 1 hour at 45° C., the slurry was divided into three equal portions. One portion was adjusted to pH 6.0 by addition of dilute sodium hydroxide solution and then the product was filtered, washed with water and dried. A second portion was filtered while still acidic and the product was washed in sequence with 60 ml. of water, 60 ml. of a 1.7 percent sodium phosphate (i.e., a mixture of 10 parts of primary sodium phosphate and 7 parts of secondary sodium phosphate) solution at pH 6.5 and finally with 60 ml. of water. When 7 percent pastes of these products were compared at a paste pH level of 7.3, the paste of the phosphate washed product was definitely better in both color and clarity than the paste of the product receiving no phosphate wash.

EXAMPLE 10

To a slurry containing 150.5 g. of undegraded 0.05 D.S. hydroxyethyl grain sorghum starch in 183 ml. of water at 40° C. was added 101 ml. of 0.602 M sodium hypochlorite solution and the slurry was maintained at a pH level of 9.6 by addition of 39.9 ml. of 0.99 N sodium hydroxide solution over a period of 338 minutes. Then the product was filtered, washed with 500 ml. of water and reslurried. After adjusting the pH level to 4.0 with 2.18 N hydrochloric acid, the product was filtered, washed with 500 ml. of water and reslurried a second time. This slurry was adjusted to pH 9.6 and the product was filtered, washed and dried.

In a second experiment, a slurry containing 150.5 g. of undegraded 0.05 D.S. hydroxyethyl grain sorghum starch in 183 ml. of water at 40° C. was adjusted to pH 2.0, stirred for 30 minutes and then the product was filtered, washed with 250 ml. of water and reslurried in sufficient water to give a slurry weight of 333 grams. This slurry was adjusted to pH 9.6 with 0.99 N sodium hydroxide solution. The starch product then was oxidized and isolated in exactly the same manner as that described above.

Analytical data presented in Table VI show that a low pH filtration is also beneficial when employed in conjunction with a hypochlorite oxidation of starch.

Table VI

| pH Level of Filtrations | 75 g. Scott Viscosity (seconds) | Paste, pH | Paste Clarity (Percent Light Transmittancy) |
|---|---|---|---|
| 9.0, 4.0, 9.6 | 62 | 7.4 | 11 |
| 2.0, 9.0, 4.0, 9.6 | 54 | 7.6 | 87 |

EXAMPLE 11

A slurry containing 180 g. of corn starch in 360 ml. of water was divided into two equal portions. To one was added sufficient 1.87 N hydrochloric acid to adjust the pH to 3.0. To the other was added sufficient dilute sodium hydroxide solution to adjust the pH to 6.5. Thereafter, each slurry was filtered and reslurried in 360 ml. of water. The pH of the first slurry was adjusted to 6.5 with dilute sodium hydroxide solution and both slurries were filtered, the cakes washed with 500 ml. of water and then dried. The product from the first slurry was distinctly whiter than that from the second.

This application is a continuation-in-part of application Serial No. 473,755, filed December 7, 1954, now abandoned.

I claim:

1. A process for improving the color and paste properties of a substance from the group consisting of starch, thin boiling starch, hydroxyalkyl starch, thin boiling hydroxyalkyl starch, and oxidized hydroxyalkyl starch which comprises dewatering an aqueous slurry of said starch product in its granule state, said slurry having a pH below about 4.0, reslurrying the dewatered product in water, adjusting the pH of the slurry to about 6.0 to about 8.0 by addition of a salt thereto, and dewatering the slurry; said salt being from the group consisting of the sodium, potassium and ammonium carbonates, primary phosphates, secondary phosphates, chlorides, and sulfates.

2. A process for improving the color and paste properties of starch products which comprises dewatering an aqueous slurry of said starch product in its granule state, said slurry having a pH below about 4.0, washing the dewatered product with a sufficient amount of an aqueous salt solution to give the product a pH of about 6.0 to about 8.0; said salt being from the group consisting of the sodium, potassium and ammonium carbonates, primary phosphates, secondary phosphates, chlorides, and sulfates.

3. Process according to claim 2 wherein the starch after the washing step is oxidized.

References Cited in the file of this patent
UNITED STATES PATENTS 2,105,052    Oltman    Jan. 11, 1938

FOREIGN PATENTS 476,056    Canada    Aug. 14, 1951

OTHER REFERENCES

Chemistry and Industry of Starch, R. Kerr, 1944, Academic Press, N.Y.